United States Patent
Petcu et al.

(10) Patent No.: US 9,529,188 B2
(45) Date of Patent: Dec. 27, 2016

(54) ELECTROWETTING DEVICE WITH MULTI LAYER SUPPORT PLATE

(71) Applicant: Amazon Technologies, Inc., Seattle, WA (US)

(72) Inventors: Cristina Maria Petcu, Eindhoven (NL); Gerben Boon, Ottersum (NL)

(73) Assignee: Amazon Technologies, Inc., Seattle, WA (US)

(*) Notice: Subject to any disclaimer, the term of this patent is extended or adjusted under 35 U.S.C. 154(b) by 0 days.

(21) Appl. No.: 14/667,896

(22) Filed: Mar. 25, 2015

(65) Prior Publication Data

US 2016/0282605 A1  Sep. 29, 2016

(51) Int. Cl.
G02B 26/00 (2006.01)
G02B 1/04 (2006.01)
G02B 1/06 (2006.01)

(52) U.S. Cl.
CPC ............... *G02B 26/005* (2013.01); *G02B 1/04* (2013.01); *G02B 1/06* (2013.01)

(58) Field of Classification Search
USPC ....... 359/237, 238, 228, 242, 253, 272, 290, 359/291, 292, 295, 298, 296
See application file for complete search history.

(56) References Cited

U.S. PATENT DOCUMENTS

| 7,117,720 B2 | 10/2006 | Bouten et al. |
| 2012/0243071 A1 | 9/2012 | Lee et al. |
| 2013/0271817 A1* | 10/2013 | Jung ............ G02B 26/005 359/290 |
| 2013/0301108 A1 | 11/2013 | Lim et al. |
| 2014/0063586 A1* | 3/2014 | Jung ............ G02B 26/005 359/290 |
| 2014/0192465 A1 | 7/2014 | Giraldo et al. |

FOREIGN PATENT DOCUMENTS

WO  2013079709 A1  6/2013

OTHER PUBLICATIONS

A. Schultz et. Al.,"Detailed analysis of defect reduction in electrowetting dielectrics through a two-layer 'barrier' approach", Thin Solid Films 534 (2013) 348-355.
J. Greener et. Al.,"Moisture Permeability Through Multilayered Barrier Films as Applied to Flexible OLED Display", Wiley InterScience, DOI 10.1002/app.26863.
Zhang et al., "Electroplating to visualize defects in Al2O3 thin films grown using atomic layer deposition",Thin Solids Films, vol. 517, Issue 11, 3269-3272, 2009.

(Continued)

*Primary Examiner* — Joseph P Martinez
*Assistant Examiner* — Brandi Thomas
(74) *Attorney, Agent, or Firm* — EIP US LLP (57) ABSTRACT

An electrowetting element comprising a first fluid and a second fluid immiscible with the first fluid. A support plate includes an electrode for applying a voltage to control a configuration of the first and second fluids and a plurality of layers between the electrode and at least one of the first or second fluids. The plurality of layers includes a first layer comprising a first plurality of pinholes and a second layer comprising fewer pinholes than the first layer. The first layer is disposed on the second layer, between the second layer and at least one of the first or second fluids.

24 Claims, 4 Drawing Sheets

(56) References Cited

OTHER PUBLICATIONS

Da Silva Sobrinho et al., "Transparent barrier coatings on polyethylene terephthalate by single and dual-frequency plasma-enhanced chemical vapor deposition", J. Vac. Sci Technol. A 16.6., Nov./Dec. 1998.

Da Silva Sobrinho et al, "Characterization of Defects in PECVD-SiO2 Coatings on PET by Confocal Microscopy", Plasma and Polymers, vol. 3, Nr. 4, 1998.

E. Biermans et al., "Measuring Porosity at the Nanoscale by Quantitative Electron Tomography", Nano Lett., 10(12), 5014-5019, 2010.

K.S.W. Sing et al., "Reporting Physisorption Data for Gas/Solid Systems with Special Reference to the Determination of Surface Area and Porosity", Pure and Applied Chemistry, vol. 57, Nr. 4, 603-619, 1985.

C. Licitra et al, "Multi-solvent ellipsometric porosimetry analysis of plasma-treated porous SiOCH films", Thin Solid Films, 518, 5140-5145, 2010.

Aresta et al., "Evidence of the filling of nano-porosity in SiO2-like layers by an initiated-CVD monomer", Microporous and Mesoporous Materials, 151, 434-439, 2012.

A.M. Coclite et al, "Single-Chamber Deposition of Multilayer Barriers by Plasma Enhanced and Initiated Chemical Vapor Deposition of Organosilicones", Plasma Processes and Polymers, vol. 7, Issue 7, 561-570, 2010.

G. Aresta et al., "Initiated-Chemical Vapor Deposition of Organosilicones: from Growth Mechanism to Multilayer Moisture Diffusion Barriers", a paper presented at the American Vacuum Society (AVS) 58th Annual International Symposium and Exhibition, 2011.

Michelle Stevens et al., "Water Vapor Permeation Testing of Ultra-Barriers: Limitations of Current Methods and Advancements Resulting in Increased Sensitivity," www.mocon.com/pdf/permeation/wvtrtestultrabarriers.pdf, Minneapolis, MN.

* cited by examiner

ELECTROWETTING DEVICE WITH MULTI LAYER SUPPORT PLATE

BACKGROUND

Electrowetting display devices are known. In an off state of a picture element of an example of such a device an oil layer covers a display area. In an on state the oil layer is retracted so as to cover less of the display area. To switch the picture element to the on state a voltage is applied via an electrically conductive fluid and an electrode, the conductive fluid being immiscible with the oil. To switch the picture element to the off state, the voltage is switched off.

Over time, the switching performance of the electrowetting display device may deteriorate. It is desirable to improve the lifetime of an electrowetting display device.

DETAILED DESCRIPTION

Figure 1:
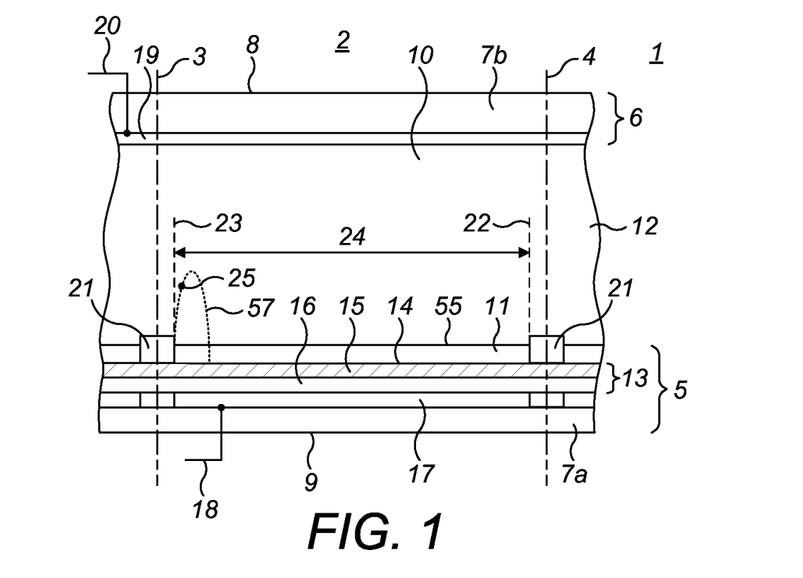
FIG. 1 shows schematically an example electrowetting element.

FIG. 1 shows a diagrammatic cross-section of part of an example of an electrowetting display device 1, including a plurality of picture elements or display elements 2, one of which is shown in the Figure and which may also be referred to as an electrowetting pixel. Such a pixel or display element is an example of an electrowetting cell or an electrowetting element, the pixel or display element being an example of an electrowetting element for providing a display effect. The lateral extent of the display element is indicated in the Figure by two dashed lines 3, 4. The display elements comprise a first support plate 5 and a second support plate 6. The support plates may be separate parts of each display element, but the support plates may be shared in common by the plurality of display elements. The support plates may include a glass or polymer substrate 7a, 7b and may be rigid or flexible. The support plates in some examples include further layers and/or structures than illustrated, for example circuitry for controlling the display elements. Such features are not illustrated, for clarity.

The display device has a viewing side 8 on which an image or display formed by the display device can be viewed and a rear side 9. In the Figure a surface of the first support plate 5, which surface is in this example a surface of the substrate 7a, defines the rear side 9; a surface of the second support plate 6, which surface is in this example a surface of the substrate 7b, defines the viewing side 8; alternatively, in other examples, a surface of the first support plate may define the viewing side. The display device may be of the reflective, transmissive or transflective type. The display device may be an active matrix driven or a direct drive display device. The plurality of display elements may be monochrome. For a colour display device the display elements may be divided in groups, each group having a different colour; alternatively, an individual display element may be able to show different colours.

A space 10, which may otherwise be considered to be a chamber, of each display element between the support plates is filled with two fluids. In the example of FIG. 1, the space 10 is filled with a first fluid 11 and a second fluid 12, at least one of which may be a liquid. The second fluid is substantially immiscible with the first fluid. Therefore, the first fluid and the second fluid do not substantially mix with each other and in some examples do not mix with each other to any degree. With the first and second fluids substantially not mixing with each other, it is envisaged in some examples that there may be some degree of mixing of the first and second fluids, but that this is considered negligible in that the majority of the volume of first fluid is not mixed with the majority of the volume of the second fluid. The substantial immiscibility of the first and second fluids is due to the properties of the first and second fluids, for example their chemical compositions; the first and second fluids tend to remain separated from each other, therefore tending not to mix together to form a homogeneous mixture of the first and second fluids. Due to this immiscibility, the first and second fluids meet each other at an interface labelled 55 in FIG. 1 for when no voltage is applied and labelled 57 for when a voltage is applied, which interface defines a boundary between the volume of the first fluid and the volume of the second fluid; this interface or boundary may be referred to as a meniscus. The location and shape of the interface between the first fluid and the second layer in examples is determined by the applied voltage. The thickness of the first and second layers in FIG. 1 is shown as an example; in other examples, the first and/or second layers may have different thicknesses.

The second fluid of the device is at least one of electrically conductive or polar, i.e. the second fluid is electrically conductive, polar, or both, and may be water, or a salt solution such as a solution of potassium chloride in water. The second fluid may be transparent; it may instead be coloured, for example, or absorbing. The first fluid of the device, which is electrically non-conductive, may for example include an alkane like decane or hexadecane, silicone oil or decalin (otherwise known as bicyclo-4,4,0-decane).

Electrically conductive in examples means that the second fluid is capable of conducting electricity; for example an electrical current may flow through the second fluid due to the flow of ions through the second fluid. Polar in examples means that the second fluid comprises at least one compound (for example a liquid vehicle) having a molecule with a net dipole; i.e. that across the molecular structure the molecule has an overall dipole moment, due to an electron distribution, with at least one part of the molecule having a negative electrical charge and at least one different part of the molecule having a positive electrical charge. Such dipole moments include permanent dipoles. The polarity is caused for example by the presence of one or more atom to atom bond in the molecule, with for example one of the atoms being a heteroatom such as oxygen or nitrogen. For example, such a polar atom to atom bond is a bond between an oxygen (O) atom and a hydrogen (H) atom, i.e. an —O—H bond, which may be in some examples due to the presence of at least one hydroxyl (—OH) group. The presence of such bonds may cause hydrogen bonding between different molecules within the second fluid.

The first fluid may absorb at least a part of the visible spectrum. The first fluid may be transmissive for a part of the visible spectrum, forming a colour filter. For this purpose the first fluid may be coloured by addition of pigment particles or a dye. Alternatively, the first fluid may be black, i.e. absorb substantially all parts of the visible spectrum, or reflecting. A reflective first fluid may reflect the entire visible spectrum, making the layer appear white, or part of it, making it have a colour. In examples, the first fluid is black and therefore absorbs substantially all parts of the optical spectrum, for example in the visible light spectrum. Typically, substantially all parts of the optical spectrum may include a degree of variation, therefore the first fluid may not absorb all wavelengths, but the majority of wavelengths within a given spectrum such as the visible spectrum, so as to perform the function of the first fluid in the element. The first fluid may therefore be configured to absorb substantially all light incident on the first fluid. For example the first fluid may absorb 90% or more of light in the visible spectrum and incident on the first fluid.

The first support plate 5 includes an insulating layer 13. The insulating layer may be transparent, for example fully transparent, in other words for example transmissive at least to visible light. The insulating layer 13 may extend between walls of a display element. To avoid short circuits between the second fluid 12 and electrodes arranged under the insulating layer, layers of the insulating layer may extend uninterrupted over a plurality of display elements 2, as shown in the Figure. The insulating layer has a surface 14 facing, i.e. closest to, the space 10 of the display element 2. The thickness of the insulating layer may be less than 2 micrometers and may be less than 1 micrometer; for example the insulating layer may be 400 nanometers or less in thickness.

The insulating layer in examples described herein is for example formed of a layer 15 which is for example formed of a hydrophobic material such as Teflon AF1600® and a barrier layer 16 with predetermined dielectric properties, the layer 15 facing, i.e. being closer to, the space 10, as shown in the Figure. The barrier layer 16 in examples is formed of a plurality of layers, as will be described in more detail below. The barrier layer 16 may have a thickness, taken in a direction perpendicular to the plane of the substrate, of between 50 nanometers and 500 nanometers.

In the absence of an applied voltage, i.e. with the applied voltage being a zero voltage, the first fluid 11 adheres preferentially to the surface of the insulating layer 13 for adjoinment by the first fluid, since the surface for adjoinment by the first fluid has a higher, i.e. greater, wettability for the first fluid than for the second fluid; the surface may therefore be hydrophobic. As will be explained, with the applied voltage being a non-zero voltage or a driving voltage, the surface has a higher wettability for the second fluid than for the first fluid; i.e. the surface with the applied non-zero voltage may be considered to be hydrophilic. Wettability relates to the relative affinity of a fluid for the surface of a solid. Wettability may be measured by the contact angle between a boundary of the fluid and the surface of the solid. The contact angle is determined by the difference in surface tension between the fluid and the solid at the fluid-solid boundary. For example, a high difference in surface tension can indicate hydrophobic properties. As the skilled person will appreciate, a material may be considered to be hydrophobic if the contact angle with water is greater than 90 degrees; a material may therefore be considered to be hydrophilic if the contact angle with water is less than 90 degrees.

Each display element 2 includes a first electrode 17 as part of the support plate 5. In examples shown there is one such electrode 17 per element; in other examples there may be more than one electrode per display element. The electrode 17 is electrically insulated from the first and second fluids by the insulating layer 13; electrodes of neighbouring display elements are separated by a nonconducting layer, although in other examples electrodes of one or more neighbouring display elements may be electrically connected. In some examples, further layers may be arranged between the insulating layer 13 and the electrode 17. The electrode 17 can be of any desired shape or form. The electrode 17 of a display element is supplied with voltage signals by a signal line 18, schematically indicated in the Figure.

The second support plate 6 for example includes a second electrode 19, which may extend between walls of a display element, and/or be disposed, for example located, above and/or covering or overlapping the walls of the display element and/or extend uninterruptedly over a plurality of display elements 2, as shown in the Figure. The electrode 19 is in electrical contact with the second fluid 12 and is common to all display elements. The electrodes 17 and 19 may be made of for example the transparent conductive material indium tin oxide (ITO). A second signal line 20 is connected to the electrode 19. Alternatively, the electrode may be arranged at a border of the support plates, where it is in electrical contact with the second fluid. This electrode may be common to all elements, when they are fluidly interconnected by and share the second fluid, uninterrupted by walls. The display element 2 can be controlled by a voltage V applied between the signal lines 18 and 20. The signal line 18 can be coupled to a matrix of control lines on the substrate 7a. The signal lines 18 and 20 are coupled to a display driving system.

The first fluid 11 in this example is confined to a display element by at least one wall, in this example walls 21, that follow the cross-section of the display element. The cross-section of a display element may have any shape; when the display elements are arranged in a matrix form, the cross-section is usually square or rectangular. Although the walls are shown as structures protruding from the insulating layer 13 and formed on a surface of the insulating layer 13, they may instead be part of a surface layer of the support plate that repels the first fluid, such as a hydrophilic or less hydrophobic layer. The walls may extend from the first to the second support plate but may instead extend partly from the first support plate to the second support plate as shown in FIG. 1.

The extent of the display element, indicated by the dashed lines 3 and 4, is defined by the center of the walls 21. The area of the surface between the walls of a display element, indicated by the dashed lines 22 and 23, is called the display area 24, over which a display effect occurs. The area of the surface on which the walls are formed may be referred to as the wall area. An extent of the surface 14 corresponding to the extent of the display area is in this example hydrophobic. The display effect depends on an extent that the first and second fluids adjoin the surface defined by the display area, in dependence on the magnitude of the applied voltage V described above. The magnitude of the applied voltage V therefore determines the configuration of the first and second fluids within the electrowetting element. In other words, the display effect depends on the configuration of the first and second fluid in the display element, which configuration depends on the magnitude of the voltage applied to the electrodes of the display element. The display effect gives rise to a display state of the display element for an observer looking at the display device. When switching the electrowetting element from one fluid configuration to a different fluid configuration the extent of second fluid adjoining the display area surface may increase or decrease, with the extent of first fluid adjoining the display area surface decreasing or increasing, respectively.

Figure 2:
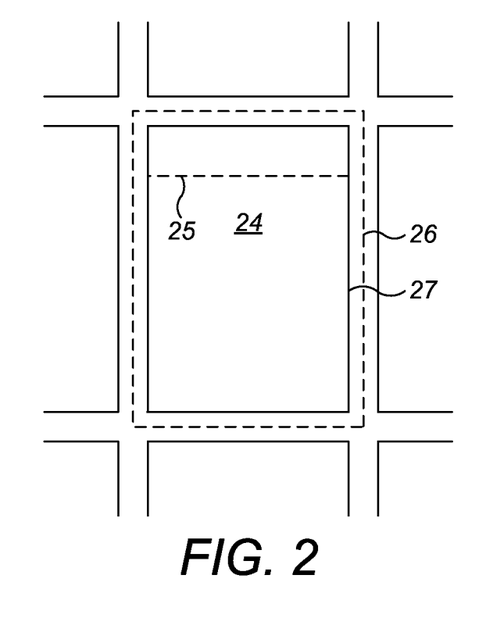
FIG. 2 shows schematically a plan view of the example electrowetting element of FIG. 1.

FIG. 2 shows a matrix of rectangular picture elements in a plan view of the hydrophobic surface of the first support plate. The extent of the central picture element in FIG. 2, corresponding to the dashed lines 3 and 4 in FIG. 1, is indicated by the dashed line 26. Line 27 indicates the inner border of a wall; the line 27 is also the edge of the display area 24.

When a zero or substantially zero voltage is applied between the electrodes 17 and 19, i.e. when the electrowetting element is in an off state, the first fluid 11 forms a layer between the walls 21, as shown in FIG. 1. Application of a voltage will cause the second fluid to displace the first fluid to contract, for example retract, the first fluid, for example against a wall as shown by the dashed shape 25 in FIG. 1 or FIG. 2. The controllable shape of the first fluid, in dependence on the magnitude of applied voltage, is used to operate the picture element as a light valve, providing a display effect over the display area 24. For example, switching the fluids to increase adjoinment of the second fluid with the display area may increase the brightness of the display effect provided by the element. This display effect determines the display state an observer will see when looking towards the viewing side of the display device. The display state can be from black to white with any intermediate grey state; in a colour display device, the display state may also include colour.

Examples of a plurality of layers for a support plate of an electrowetting element will now be described with reference to FIGS. 3 and 4. In these examples, the plurality of layers form the barrier layer 16 of FIG. 1 but in other examples further layers may form part of the barrier layer in addition to the plurality of layers described here.

Figure 3:
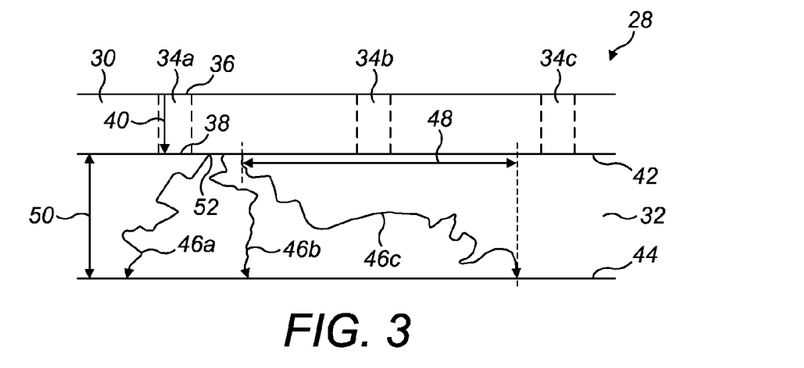
FIG. 3 shows schematically an example of layers of a support plate of an example electrowetting element.

FIG. 3 shows an example of a plurality of layers 28 of a support plate of an electrowetting element. The plurality of layers 28 include a first layer 30 disposed, for example located, on a second layer 32. For example, a surface of the second layer 32, which surface is nearer to the first and second fluids than other surfaces of the second layer 32, lies in contact with a surface of the first layer 30. The first layer 30 comprises a first plurality of pinholes 34a, 34b, 34c, collectively referred to with the reference numeral 34. A pinhole is typically a through-hole which passes substantially directly from one side of a layer to the other side. A pinhole, for example a through-hole, which passes substantially directly through a layer may, for example, pass directly or approximately directly through a layer. For example, a pathway through the pinhole may have a length which is approximately equal to a thickness of the layer, such as equal to the layer thickness, or greater than the layer thickness by at least 1%, 2%, 5%, or 10%, or greater than the thickness of the layer by at least one of 20%, 30%, 40%, less than 50%, approximately 50% or 50% of the layer thickness. The layer thickness in some examples is for example an average layer thickness, for example a mean layer thickness, across an entire extent of the layer. One end of a pinhole may at least partly overlap the other end of the pinhole such that it would be possible to draw an approximately straight line between the two ends, for example with a deviation of less than 20 degrees over the line's length. As the skilled person will appreciate, a pinhole is a term of art; a pinhole's dimensions do not necessarily correspond with those of a pin. A pinhole may have a width of the order of nanometers, which may be comparable to or larger than the size of a molecule transmissible through the pinhole (which molecule may otherwise be referred to as a permeant molecule), for example greater than or equal to 0.3 nanometers with water and/or oxygen as a permeant molecule. Pinholes may have a variety of shapes; for example, a pinhole may be cylindrical, cuboid or tapering towards one end.

The second layer 32 has fewer pinholes than the first layer 30, for example at least an order of magnitude fewer. For example, the second layer may have a negligible quantity of pinholes, for example with a pinhole density of one pinhole per 100 $\mu m^2$ (micrometer squared) or less. In contrast, the first layer may have more than one pinhole per 100 $\mu m^2$ (micrometer squared) or the distance between one pinhole and a neighbouring pinhole, which distance may otherwise be referred to as the distribution length, is at most 1 $\mu m$ (micrometer). In other examples, the second layer may be substantially free from pinholes, for example with zero pinholes within measurement tolerances or with zero pinholes.

Pinholes can be detected using a variety of methods, as the skilled person will appreciate. For example, pinholes in for example an inorganic layer may be decorated by electroplating the layer and then the layer may be imaged using scanning electron microscopy (SEM) to obtain an image of the layer in which the pinholes are visible. For example, copper can be electroplated on the layer and then inspected using optical or electron microscopy, as is known in the art. Alternatively, light may be scattered from gas bubbles which form at pinholes in some cases. The scattered light in such cases can be imaged directly, also using SEM for example. Further techniques to visualise pinholes in for example an inorganic layer include confocal microscopy and transmission electron microscopy, as known in the art. These techniques include exposing inorganic layers applied, for example deposited, on a polymeric substrate to an oxygen ($O_2$) reactive ion etching (RIE) plasma. Exposure to atomic oxygen, the main reactive species in $O_2$ plasma, causes etching of the polymeric substrate through the pinholes present in the inorganic layer, which can be visualised using the optical techniques discussed above.

In the example of FIG. 3, the plurality of layers 28 of the support plate are disposed, for example located, between, for example with one of the layers contacting an electrode (not shown), for use in applying a voltage to control a configuration of a first fluid and a second fluid immiscible with the first fluid (also not shown), and at least one of the first or second fluids. The first layer 30 is disposed, for example located between the second layer 32 and at least one of the first and second fluids. For example, the plurality of layers 28 of FIG. 3 may form or be part of the barrier layer 16 of FIGS. 1 and 2 which, as described above, forms part of the first support plate 5 and is positioned between the first electrode 17 and the first and second fluids 11, 12. The support plate may also include a hydrophobic layer, such as the layer 15 of FIG. 1, the first fluid adjoining at least a part of a surface of the hydrophobic layer. In examples, the hydrophobic layer comprises more than 80%, more than 90%, more than 95%, approximately 100% or 100% of a hydrophobic material by weight or by volume. The remainder of the hydrophobic layer may for example be formed of a different material than a hydrophobic material. In examples in which the support plate includes a hydrophobic layer, the hydrophobic layer may be a layer of the plurality of a layers or a separate layer (as in the example of FIGS. 1 and 2). It is to be appreciated that, in further examples, the plurality of layers of FIG. 3 may be part of a support plate which differs from that described with reference to FIGS. 1 and 2, as will be described in more detail below.

As is known, an electrowetting element includes a capacitor; a first plate of the capacitor is the first electrode and a second plate of the capacitor is the second fluid, which is provided with electric charge via the second electrode. Therefore, the plurality of layers 28 between the first electrode and the second fluid form a dielectric layer in examples. A capacitance of the electrowetting element may thus depend on properties of the plurality of layers 28.

In examples, providing a plurality of layers with certain properties allows a relatively high capacitive coupling between the electrode and the fluids to be obtained. This can reduce the driving voltage which must be applied to the electrodes to obtain a desired display effect compared with an element with a lower capacitive coupling. This can therefore reduce the power consumption of the electrowetting element.

The plurality of layers 28 in examples have a further function in addition to contributing to a capacitance of the electrowetting element. By providing a first layer with a first plurality of pinholes on a second layer comprising fewer pinholes than the first layer, leakage of at least one component of either or both of the first fluid and the second fluid from the space 10 of the electrowetting element, for example through the insulating layer 13 of the first support plate 5 towards, and in some cases onto, the first electrode 17, may be limited or reduced compared to an element without such layers. This may therefore facilitate in maintaining the mechanical and electrical integrity of the electrowetting element. Thus, providing a support plate with a plurality of layers in accordance with examples can increase the lifetime of an electrowetting display device, as will now be explained.

Leakage of at least one component of the second fluid from the space of the element, which refers to any passage or movement by which at least one component of the second fluid exits or leaves the space of the element, for example towards an electrode such as the first electrode 17 of FIG. 1, may adversely affect the performance of the element. For example, a display state obtainable by the element for a given applied voltage may be altered by such leakage which may lead to a deterioration in display quality. Thus, leakage of at least one component of the second fluid from a respective space of a plurality of elements of an electrowetting display device may reduce a lifetime of the device. In further examples, it is envisaged that such leakage may occur for at least one component of at least one of the first fluid or the second fluid; in other words at least one component of either or both of the first fluid and the second fluid. The at least one component may for example be one or more, for example all, of the molecular component(s) of the first fluid or the second fluid fluids, for example.

Pinholes passing directly through a layer in a known element allow at least one component of the second fluid to pass through the layer and thereby exit the space of the element, towards and maybe ultimately reaching the underlying electrode. In contrast, by providing a second layer which comprises fewer pinholes than the first layer as in examples described herein so that pinholes from the first layer do not extend all the way, for example continuously, through the first and second layers, passage of at least one component of at least one of the first fluid or the second fluid is restricted. Thus, a plurality of layers in accordance with examples described herein limit or reduce leakage of at last one component of at least one of the first fluid or the second fluid from a space of an electrowetting element, for example towards the electrode. This can increase a lifetime of an electrowetting display device comprising the electrowetting element, as explained above. For example, where the second fluid includes water, the plurality of layers in accordance with examples can reduce the transmission, for example diffusion, of water through at least one of the plurality of layers and reduce the rate at which water is incident on the underlying electrode.

Combining the dielectric properties and leakage reduction functions in a plurality of layers allows an electrowetting element with these functions to be manufactured straightforwardly and cost effectively.

Referring back to FIG. 3, a pinhole 34a of the first plurality of pinholes 34 of the first layer 30 has a first end 36 closest to the space, and therefore at least one of the first and/or second fluids, and a second end 38 closest to the second layer 32 in this example. A pinhole pathway 40 extends from the first end 36 to the second end 38 of the pinhole 34a. In examples, the pinhole pathway 40 is such that transmission of at least one component of at least one of the first or second fluids, for example water of the second fluid, through the first layer 30 can occur. In examples the transmission of at least one component of at least one of the first fluid or the second fluid through the first layer may include at least one species of ions for example sodium ions $Na^+$, potassium ions $K^+$, iodide ions $I^-$, chloride ions $Cl^-$ of molecules of at least one gas dissolved in the first fluid.

FIG. 3 illustrates various features of pinhole 34a in first layer 30, including the second end 38 located at the interface between the pinhole 34a and second layer 32. Pinhole ends typically include the portion of the pinhole at a surface of a layer in which the pinhole exists, or at the interface between two layers, at least one of which includes the pinhole. Depending on the shape of the pinhole, the end may have various shapes, e.g., variation in cross-sectional shape, edge shape, material uniformity, and the like. The end may also include the opening only, or the opening and some small portion of the pinhole coextensive with the opening.

Transmission involves at least one component of at least one of the first fluid or the second fluid being incident on a side of the first layer, travelling through the first layer and then exiting the first layer on an opposite side, in examples. For example, transmission may refer to passage, migration, diffusion or other movement of the at least one component of at least one of the first fluid or the second fluid through the first layer. Passage of the at least one component of at least one of the first fluid or the second fluid only partly through the first layer, for example such that the at least one component of at least one of the first fluid or the second fluid enters but does not exit the first layer, is not considered transmission of the at least part of the second fluid through the first layer in examples.

In the example shown in FIG. 3, the pinholes of the first plurality of pinholes 34 each have such a pinhole pathway 40 (although only one pinhole pathway 40 is labelled for clarity), though in other examples, at least one pinhole of the first plurality of pinholes may have a pinhole pathway. In further examples, a pinhole of the first plurality of pinholes may have one or more pathways between first and second ends which is not suitable for at least one component of at least one of the first or second fluids to pass through. In examples, the one or more pathways may be narrower than a molecule size of at least one component of the second fluid, for example of water molecules. Such pathways are not considered to be a "pinhole pathway".

In examples, where the second fluid is formed of more than one component, for example different molecular components such as water and a polyol, some of the components of the second fluid may be able to pass through the pinhole pathway and some may not. This may be the case where some of the components of the second fluid, for example one component, are small enough to fit through the pinhole and follow the pinhole pathway while other components of the second fluid are too large. Alternatively, for example where the pinhole is relatively large compared to molecules of the second fluid, all components of the second fluid may pass through the pinhole pathway.

Despite at least one component of at least one of the first fluid or the second fluid, for example of the second fluid, being able to pass through the pinhole pathway 40 of FIG. 3, it has been surprisingly realised that leakage of at least one component of at least one of the first fluid or the second fluid from the space of the electrowetting element can still be limited by providing a second layer 32 comprising fewer pinholes than the first layer 30, as described above. Thus, leakage of at least one component of at least one of the first fluid or the second fluid can be limited even if the first layer 30 is manufactured so that it comprises pinholes which provide a pinhole pathway 40 for transmission of at least one component of at least one of the first fluid or the second fluid.

In examples, a pinhole pathway of at least one pinhole of the first plurality of pinholes, such as the pinhole pathway 40 illustrated in FIG. 3, has a length substantially equal to a thickness of the first layer. For example, the length of the pinhole pathway may be equal to or approximately equal to the thickness of the first layer, for example allowing a degree of variation, such as greater than the layer thickness by at least 1%, 2%, 5%, or 10%, or greater than the thickness of the first layer by at least one of 20%, 30%, 40%, less than 50%, approximately 50%, or 50% of the first layer thickness. Thus, the pinhole pathway may provide a substantially direct route for transmission of the at least one component of the at least one of the first fluid or the second fluid through the first layer, i.e. a route or pathway which is substantially without deviations, which may for example be approximated by a straight line, as explained above with reference to the pinhole itself and as shown for example in FIG. 3 with the reference numeral 40. Even with the pinhole pathway providing a substantially direct route through the first layer, providing a plurality of layers in accordance with examples described herein notably reduces leakage of the fluids from the element, thereby improving the lifetime of the element compared with a known electrowetting element.

The second layer 32 in the example of FIG. 3 has a first surface 42 contacting the first layer 30 and a second surface 44 closest to, and in some examples contacting, the electrode (not shown). The second layer 32 in this example has a plurality of migration pathways 46a, 46b, 46c, collectively referred to with the reference numeral 46, some of which are shown schematically in the Figure, for transmission of at least one component of at least one of the first fluid or the second fluid, for example of the second fluid, through the second layer 32, where the term transmission is to be interpreted as described above.

A migration pathway is for example any empty space or void within the second layer which is large enough for at least one component of at least one of the first fluid or the second fluid to pass through. For example, voids between polymer molecules, for example polymer chains, interstitial spaces between molecules or pores in a material at least partly forming the second layer can be considered to form at least part of a migration pathway where such voids or spaces allow the at least one component of at least one of the first fluid or the second fluid to migrate, for example by diffusion, capillary action, or other transmissive processes, through the second layer. Indeed, a migration pathway may be considered to be any channel or conduit through which at least one component of at least one of the first fluid or the second fluid can pass through the second layer. Accordingly, a pinhole which provides a pinhole pathway can be considered to provide a migration pathway; in other words, a pinhole pathway is a subset of a migration pathway. In contrast, the converse is not always true: migration pathways are not all pinhole pathways. As explained above, a pinhole pathway is a pathway through a pinhole as understood in the art and described above. Thus, other voids or spaces which are not pinholes do not form a pinhole pathway, although they may form a migration pathway provided they allow transmission of the at least one component of at least one of the first fluid or the second fluid through the second layer. Furthermore, as explained above, the second layer 32 in the example of FIG. 3 comprises fewer pinholes than the first layer 30. Thus, in examples substantially all, for example more than 90% or more than 95%, approximately 100% or 100%, of the migration pathways of the second layer are not pinhole pathways; instead, they are formed from other voids or spaces which are not pinholes. Therefore, migration of the at least one component of the second fluid through the second layer is for example dominated by diffusion properties of the second layer, for example diffusivity and/or solubility properties, whereas passage of the at least one component of the second fluid through the first layer is dominated by the pinholes intrinsically present in the layer.

In examples, such as that of FIG. 3, at least one of the migration pathways 46 has a length which is at least twice the thickness of the second layer 32. At least one of the migration pathways may in examples extend into an adjacent electrowetting element, for example with the at least one migration pathway extending into a second layer (similar to the second layer 32) of the adjacent electrowetting element; the second layers of these two electrowetting elements may be formed by a single continuous layer of material extending across both electrowetting elements. Thus, the migration pathways 46 of FIG. 3 provide a relatively indirect route for the at least one component of at least one of the first fluid or the second fluid to migrate through the second layer 32. In further examples, at least one of the migration pathways may extend laterally through the second layer by a distance which is at least twice the thickness of the second layer or at least one of the migration pathways may extend laterally into a second layer of an adjacent electrowetting element, for example by extending in a sideways direction such as in a direction parallel or substantially parallel, for example within plus or minus 1%, 2%, 5% or 10% of parallel, to a plane of the display area described above with reference to FIG. 1, which may be horizontal for example. In the example of FIG. 3, one of the migration pathways 46c extends laterally with a distance 48 which is at least twice as large as a thickness 50 of the second layer 32.

Migration pathways which are significantly longer than or have a lateral extent which is greater than a thickness of the second layer may therefore provide a route through the second layer for the at least one component of the at least one of the first fluid or the second fluid which is, for example, tortuous, meandering or circuitous. Such tortuous migration pathways may reduce the rate of transmission of at least one component of at least one of the first fluid or the second fluid through the second layer and therefore reduce the rate of leakage of at least one component of at least one of the first fluid or the second fluid.

It is noted that with at least one of the migration pathways having a lateral extent, an electric field present when a voltage is applied between the electrode and the second fluid does not assist movement of the at least one component of at least one of the first fluid or the second fluid through the plurality of layers. This is because the direction of the lateral extent of the migration pathway is not aligned or coincident, for example is at least partly orthogonal, to the electric field lines, meaning that, in these parts of the migration pathway, there is no electric field gradient in the lateral direction and therefore no driving force for moving the at least one component of the second fluid and in some examples the at least one component of the first fluid, for example water and/or ions, through the plurality of layers in a lateral direction along the migration pathway. This effect assists to reduce transmission of at least one component of at least one of the first fluid or the second fluid through the second layer, for example by increasing the time taken for the at least one component of the at least one of the first fluid or the second fluid to pass from one side of the second layer to an opposite side of the second layer.

In examples, a migration pathway of the plurality of migration pathways has a first end closest to the first layer and a second end closest to the electrode, where an end is as described above for example. In these examples, the first end of the migration pathway may be laterally offset from the second end of at least one pinhole of the first plurality of pinholes, where laterally is as described above for example. FIG. 3 shows such an example. In FIG. 3, a first end 52 of one of the migration pathways 46a does not align with a second end 38 of one of the pinholes 34a of the first plurality of pinholes 34; the first end 52 of the migration pathway 46c is thus considered to be laterally offset from the second end 38 of the pinhole 34a. As the first end 52 of the migration pathway 46a is at a different location from the second end 38 of the pinhole 34a, the at least one component of at least one of the first fluid or of the second fluid which has travelled through the pinhole pathway 40 through the pinhole 34a must therefore travel laterally from the second end 38 of the pinhole 34a to the first end 52 of the migration pathway 46c for it to begin its passage through the second layer 32. This therefore increases the time it takes for transmission of the at least one component of at least one of the first fluid or the second fluid through the first and second layers 30, 32, which in examples reduces the rate of leakage of the at least one component of the first fluid or the second fluid from the electrowetting element.

In examples, for example that of FIG. 3, the first layer 30 comprises a material with a first transmission rate for transmission of at least one component of at least one of the first fluid or the second fluid, for example at least one component of the second fluid, through the first layer 30 and the second layer 32 comprises a material with a second transmission rate for transmission of the at least one component of the at least one of the first fluid or the second fluid through the second layer 32. The transmission rate in examples is the rate of transmission, in other words passage, of a fluid or at least one component of a fluid through a layer. Various techniques may be used to measure the transmission rate as the skilled person will appreciate, including gravimetric techniques which measure the gain or loss of a fluid by mass, a calcium (Ca) test which can be used to measure the water permeability of a layer deposited on a thin film of calcium or barium by measuring the change in transmissivity or reflectivity over time, and a Mocon test, which utilises a coulometric detector to measure the permeation of water vapour (available from Mocon Inc., 7500 Mendelssohn Ave N, Minneapolis, Minn. 55428, USA). It is to be noted that to be compared against each other the first and second transmission rates are to be measured under the same conditions, for example temperature and humidity, to ensure an accurate comparison between the two measurements.

In these examples, such as that of FIG. 3, the first transmission rate may be lower than the second transmission rate. This is counterintuitive: despite the first layer 30 comprising pinholes and the second layer 32 comprising fewer pinholes than the first layer 30, the first transmission rate through the first layer 30 may nevertheless be lower than the second transmission rate through the second layer 32. This may be the case for example where the second layer has a relatively large quantity and/or size of migration pathways so that at least one component of at least one of the first fluid or the second fluid can more easily pass and/or more of the at least one component of at least one of the first fluid or the second fluid can simultaneously pass through the second layer compared with the first layer and where the first layer has a lower density of pinholes and/or pinholes of a smaller size such that at least one component of at least one of the first fluid or the second fluid cannot as easily or rapidly pass through the first layer. Despite the second transmission rate being higher than the first transmission rate, such examples still limit passage of at least one component of at least one of the first fluid or the second fluid from the space of the electrowetting element. Introducing a second layer 32 beneath the first layer 30 means that there is a transition from one material (with a plurality of pinholes) to another material (which comprises fewer pinholes than the first layer) such that there may be discontinuities between pinholes 34 of the first layer 30 and migration pathways 46 through the second layer 32 for transmission of at least one component of at least one of the first fluid or the second fluid, as shown in the example of FIG. 3 which may reduce the rate at which the at least one component of at least one of the first fluid or the second fluid, for example at least one component of the second fluid, is transmitted through a combination of the first and second layers 30, 32. In further examples, the first transmission rate may instead be higher than the second transmission rate.

In examples, for example that of FIG. 3, a unit volume of the first layer 30, where a unit volume is a given volume, for example 1 micrometer cubed ($\mu m^3$) or 1 millimeter cubed ($mm^3$), has a first plurality of voids together occupying a first total void volume and a unit volume of the second layer 32 has a second plurality of voids together occupying a second total void volume, where the unit volume of the first and second layers 30, 32 is of the same volume. In these examples, the first total void volume is lower than the second total void volume. The first and second void volumes may be referred to as first and second void fractions for a unit volume respectively. A void is typically any space in a material. Thus, for example, pinholes, interstitial spaces and pores are all types of void. The void fraction of a material may be measured using a variety of methods as will be appreciated by the person skilled in the art. These methods include transmission electron microscopy (TEM), industrial computerised tomography (CT) scanning of a sample to create a 3D rendering of external and internal geometry of that sample and then analysing the rendering to determine the void fraction, gravimetric methods which involve saturating voids with a liquid and then performing a desorption technique, for example by heating the sample in an oven, while performing a gravimetric or calorimetric analysis (known as thermal gravimetric analysis (TGA) and differential scanning calorimetry (DSC) respectively), optical methods which involve determining the area of the material compared with the area of voids visible under a microscope, methods involving determining the volume of the solid part of a sample, determining the total volume of a sample including voids and then calculating the void fraction from this, and in situ ellipsometry methods that involve monitoring the change in refractive index of an analysed layer during adsorption and desorbtion of an organic solvent for example, (also referred to as "ellipsometric porosimetry").

With the second void fraction being higher than the first void fraction, the second layer 32 may in examples, such as that of FIG. 3, act in a sponge-like manner by trapping at least one component of at least one of the first fluid or the second fluid 32 in its voids, reducing the rate at which the at least one component of at least one of the first fluid or the second fluid is transmitted through the second layer 32.

In examples, such as that of FIG. 3, the first layer 30 comprises at least one inorganic material and the second layer 32 comprises at least one organic material. For example, the first layer 30 may comprise more than 80%, more than 90%, more than 95%, approximately 100% or 100% of at least one inorganic material by weight or by volume and the second layer 32 may comprise more than 80%, more than 90%, more than 95%, approximately 100% or 100% of at least one organic material by weight or by volume. An organic material is typically any material or compound which comprises a carbon atom bonded to a hydrogen atom, i.e. a C—H bond. An organic compound may for example be a polymer. In examples a polymer is a molecule formed of a plurality of repeating monomer molecules as the skilled person will understand, for example linked together to form a backbone of the polymer molecule. As will be appreciated by the skilled person, the repeating monomer molecules may not all be the same; for example the organic compound may be a co-polymer comprising a repetition of two different monomer molecules in an arbitrary ratio. In examples, the organic material comprises a plurality of polymer molecules which together may form an amorphous solid material; the term amorphous is considered to mean that a material is substantially, for example predominantly, or entirely, non-crystalline. A non-crystalline material for example has no crystalline structures, or is not predominantly crystalline, a crystalline structure having a regular structure, for example with an ordered arrangement of atoms therein, which for example are arranged as a two dimensional or three dimensional lattice. In other examples, the organic material may comprise a polymer with a substantially (for example predominantly, or entirely) crystalline structure, which for example has an ordered arrangement of molecule chains, such as folded chains.

In contrast, an inorganic material is, in examples, any material or compound which is not organic. Therefore, an inorganic material or compound may not include carbon or may not include a carbon atom bonded to a hydrogen atom (i.e. a C—H bond). An inorganic material may for example be a crystalline material, for example due to formation using a vapour deposition process such as those described herein. In other examples, an inorganic material may be amorphous. An inorganic material may be considered to comprise atoms which form one or more lattices, for example, with a structure which is crystalline or amorphous.

For example, the second layer may comprise one or more of: poly(vinylidene fluoride) $(-(C_2H_2F_2)n-)$, poly(vinylidene fluoride) comprising titanium dioxide ($TiO_2$) particles, poly(vinylidene fluoride) comprising zirconium dioxide ($ZrO_2$) particles, poly(vinylidene fluoride-co-hexafluoropropylene) $((-CH_2CF_2-)_x(-CF_2CF(CF_3)-)_y)$, poly(vinylidene fluoride-co-hexafluoropropylene) comprising titanium dioxide particles, poly(vinylidene fluoride-co-hexafluoropropylene) comprising zirconium dioxide particles, poly(vinyl alcohol) $((CH_2CH(OH))_n)$, poly(vinyl alcohol) comprising titanium dioxide particles, poly(vinyl alcohol) comprising zirconium dioxide particles, cyanoEthylPullulan $(C_6H_7O_2(OR)_3)_n$, where $R=H$ or $CH_2CH_2CN$), cyanoEthylPullulan comprising titanium dioxide particles, cyanoEthylPullulan comprising zirconium dioxide particles, polyimide $(C_{22}H_{10}N_2O_5)$, polyimide comprising titanium dioxide particles, polyimide comprising zirconium dioxide particles or an organosilicon-based material, for example an organosilicon-based thin film where an organosilicon-based material in examples is a compound or compounds comprising at least one carbon-silicon bond, as the skilled person will appreciate. x, y, z and n are in the examples above and below each an integer. As the skilled person will appreciate, these materials are readily available commercially and, for example, may be formed from a solution or from a chemical reaction, such as a polymerisation reaction, during deposition, as will be described in more detail below for examples. In examples, the second layer may comprise one or more of: a thermoplastic polymer (for example a material which becomes fluid with plastic properties upon heating and hardens on cooling), a thermoset polymer (for example a material which is a fluid, for example with plastic properties, which hardens upon heating and/or exposure to radiation), or a co-polymer (for example a polymer formed of at least two different monomers). It is noted that where titanium dioxide or zirconium dioxide is referred to as comprised by a polymer material, that dioxide is for example dispersed within the polymer material.

In addition, or alternatively, the first layer may comprise one or more of: silicon oxide ($SiO_x$), for example silicon dioxide ($SiO_2$), silicon nitride (a-$Si_xN_yO_z$:H), aluminium oxide ($Al_xO_y$), tantalum oxide ($Ta_2O_5$), hafnium oxide ($HfO_2$), titanium dioxide ($TiO_2$), or zirconium dioxide ($ZrO_2$). For example, the first layer may comprise one or more of: an oxide, a nitride, an oxy-nitride, a carbide, or a carbo-nitride. A first layer comprising one or more of these compounds in examples may be applied, for example deposited, directly using methods such as sputter deposition or physical vapour deposition or can be formed by a chemical reaction during deposition from a precursor in a reaction chamber or in contact with the substrate, such as chemical vapour deposition, plasma-enhanced chemical vapour deposition or atomic layer deposition. For example, a first layer may be applied, for example deposited, upon introducing a gas or liquid precursor to a plasma. For example, silicon nitride may be deposited from argon (Ar), ammonia ($NH_3$), silane ($SiH_4$), nitrogen ($N_2$) and/or hydrogen ($H_2$), silicon dioxide may be deposited from hexamethyldisiloxane (HMDSO) liquid and oxygen ($O_2$) and aluminium oxide may be deposited from trimethylaluminium liquid (TMA) and Argon (Ar) gas. Example methods of applying the first layer are described in more detail below.

As explained above, in examples the first and second layers act as dielectric materials. In examples, the first layer comprises a material with a first dielectric constant which is one of substantially equal to or higher than 3.5 and the second layer comprises a material with a second dielectric constant which is one of substantially equal to or higher than 3.5, for example within plus or minus 10% of 3.5. FIG. 3 shows such an example. Materials with a dielectric constant which is equal to or above 3.5 are considered in examples herein to be high dielectric materials. Providing first and second layers 30, 32 which comprise high dielectric constant materials, as in FIG. 3, increases the capacitance of the electrowetting element and thus the capacitive coupling between the electrode and the first and second fluids. As explained above, relatively high capacitive coupling in examples allows a lower driving voltage to be applied to the electrode to obtain a desired display effect compared with an element with a lower capacitive coupling. This can therefore reduce the power consumption of the electrowetting element. In other examples, providing the first and/or second layers as thinly as feasibly possible may be used alternatively or in addition to increase the capacitance of the electrowetting element.

In further examples, the second layer comprises a material having a dielectric constant which is less than 3.5 and a material having a dielectric constant which is one of substantially equal to or higher than 3.5. For example, it may be difficult to apply, for example deposit, a thin layer of material with a high dielectric constant. In contrast, it can be easier to thinly apply low dielectric constant materials. Therefore, by forming the layer of a combination of a material with a low dielectric constant (in other words, with a dielectric constant which is less than 3.5) and a material with a high dielectric constant, the layer may be deposited with a higher overall capacitive coupling than would be achieved if the layer did not comprise the high dielectric constant material. In examples, the second layer comprises polyimide comprising titanium dioxide and/or zirconium dioxide particles, where in examples, as the skilled person will appreciate, polyimide is a low dielectric constant organic material and titanium dioxide and zirconium dioxide are high dielectric constant materials.

Figure 4:
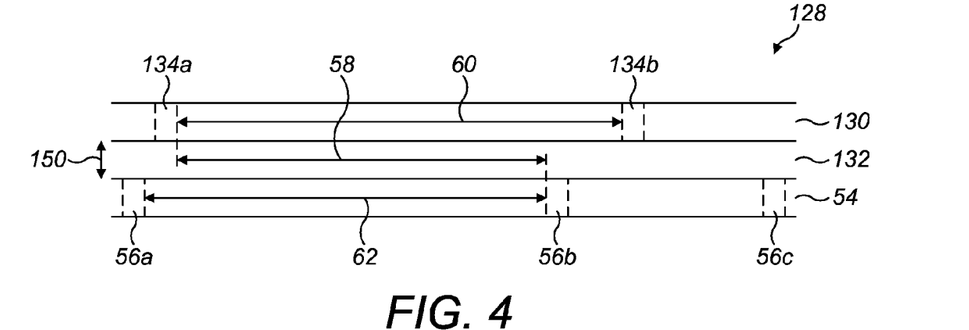
FIG. 4 shows schematically a further example of layers of a support plate of an example electrowetting element.

Referring now to FIG. 4, FIG. 4 shows a further example of a plurality of layers for a support plate of an electrowetting element. Features of this example are similar to those described previously and are referred to and illustrated using the same reference numerals incremented by 100; corresponding descriptions should be taken to apply also.

The plurality of layers 128 of FIG. 4 includes a third layer 54 comprising a second plurality of pinholes 56. It is to be noted that the phrase "second plurality of pinholes" in relation to the third layer is used to clearly distinguish the plurality of pinholes of the third layer from the plurality of pinholes of the first layer. Therefore, in examples, the first layer does not have a second or further plurality of pinholes and the third layer does not have a first or further plurality of pinholes.

The third layer 54 is similar to the first layer 30 of FIG. 3; features described with reference to the first layer 30 of FIG. 3 may also be present in the third layer 54 of FIG. 4. The second layer 132 of FIG. 4 is disposed, for example located, on, for example in contact with, the third layer 54, between the first layer 130 and the third layer 54. In examples, the third layer 54 is in contact with an electrode, for example the first electrode 17 of FIG. 1, although in other examples there may be other layers or components between the third layer and the electrode such that the third layer does not contact the electrode. By adding a third layer to the two layers of the example of FIG. 3, transmission of at least one component of at least one of the first fluid or the second fluid through the plurality of layers may be further reduced; including additional layers in the plurality of layers may reduce the rate at which the at least one component of the second fluid leaks from the space of the electrowetting element even further. Moreover, such a stack of first, second and third layers in examples increases structural rigidity of the support plate but may in some examples still give sufficient flexibility for manufacturing the electrowetting element using a roll to roll process as is known in the art.

In further examples, the plurality of layers may include one or more further layers, each of which may or may not include pinholes. For example, the plurality of layers may comprise a repeating pair of layers such as the first and second layers 30, 32 of FIG. 3.

In examples, such as the example of FIG. 4, at least one pinhole 134a of the first plurality of pinholes 134 is laterally offset from at least one pinhole 56b of the second plurality of pinholes, 56a, 56b, 56c, collectively referred to with the reference numeral 56. A lateral offset between pinholes of the first and second plurality of pinholes 134a, 56b means for example that at least one component of at least one of the first fluid or the second fluid must travel laterally from the pinhole of the first plurality of pinholes 134a to reach the offset pinhole of the second plurality of pinholes 56b. This therefore increases a total path length which must be traversed by the at least one component of at least one of the first fluid or the second fluid for it to pass through the plurality of layers towards the electrode. For example, a lateral distance 58 between a pinhole of the first plurality of pinholes 134a and a pinhole of the second plurality of pinholes 56b, taken from an edge of the pinhole of the first plurality of pinholes 134a which is closest to an edge of the pinhole of the second plurality of pinholes 56b as illustrated in the Figure, may be notably larger than a thickness 150 of the second layer 132. A lateral direction in examples is a sideways direction such as a direction parallel or substantially parallel, for example within plus or minus 1%, 2%, 5% or 10% of parallel, to a plane of the display area described above with reference to FIG. 1, which may be horizontal for example. For example, the path length may have a lateral component (such as the lateral distance 58 illustrated in FIG. 4) and a vertical component, which is perpendicular to the lateral component. In an example, the lateral distance 58 may for example be approximately 1 micrometer and the thickness of the second layer may for example be 100 nanometers, which is for example an order of magnitude less than the lateral distance.

Where the second layer has a plurality of migration pathways for transmission of at least one component of at least one of the first fluid or the second fluid, at least part of one or more of the migration pathways (not illustrated in FIG. 4, but corresponding with those shown in FIG. 3) may end in a location in which there is no pinhole in the third layer, meaning the at least one component of at least one of the first fluid or the second fluid may then have to straddle an interface between the second layer and the third layer, in a highly restrictive manner for transmission of the at least one component of at least one of the first fluid or the second fluid, for example. Thus, the at least one component of the second fluid which follows these migration pathways will not be able to exit the second layer 132 directly at the end of these migration pathways; at the end of these migration pathways, it will be incident on a solid part of the third layer 54 which it cannot pass through. Thus, the at least one component of at least one of the first fluid or the second fluid must either pass along the interface between the second layer 132 and the third layer 54 until it reaches a pinhole of the second plurality of pinholes 56 for it to pass through, or it must follow a migration pathway which ends at an entrance to a pinhole of the second plurality of pinholes 56. Such migration pathways may be rare; for example, there may be many migration pathways with ends which do not align with either a pinhole of the first plurality of pinholes 134 or with a pinhole of the second plurality of pinholes 56 and few or very few migration pathways which provide a route for the at least one component of at least one of the first fluid or the second fluid from a pinhole of the first plurality of pinholes 134 to a pinhole of the second plurality of pinholes 56.

In examples, a lateral distance between one or more of: two neighbouring pinholes of the first plurality of pinholes, or two neighbouring pinholes of the second plurality of pinholes is larger than a thickness of the second layer. This lateral distance in some examples may be taken between a pinhole of one electrowetting element and a pinhole of an adjacent electrowetting element. A thickness of the second layer, for example an average layer thickness, in some examples is in the range of 50-200 nanometers, for example 100 nanometers. In contrast, the lateral distance between two neighbouring pinholes of the first or second plurality of pinholes is for example in the range of 1 to 10 micrometers, which is for example a factor of 100 to 200 times the length of the pinhole pathway. FIG. 4 shows an example of a lateral distance 60 between two neighbouring pinholes of the first plurality of pinholes 134, where neighbouring pinholes are two pinholes which are closest to each other, in other words, with a smallest distance between each other compared to other pinholes. FIG. 4 also shows an example of a lateral distance 62 between two neighbouring pinholes of the second plurality of pinholes 56. In the example of FIG. 4, the lateral distance 60 between two neighbouring pinholes of the first plurality of pinholes 134 is greater than the thickness 150 of the second layer 132; the lateral distance 62 between two neighbouring pinholes of the second plurality of pinholes 56 is also greater than the thickness 150 of the second layer 132.

A larger lateral distance between neighbouring pinholes than a thickness of the second layer means that the pinholes are spaced relatively far apart compared with the second thickness. In other examples, the lateral distance between one or more of: two neighbouring pinholes of the first plurality of pinholes, or two neighbouring pinholes of the second plurality of pinholes may be larger than a thickness of the first layer and/or the second layer.

Relatively large lateral distances between pinholes, for example with a low density of pinholes, in examples further limit passage of at least one component of at least one of the first fluid or the second fluid through the plurality of layers as the at least one component of at least one of the first fluid or the second fluid must be incident on a pinhole to pass through the first layer, to exit the second layer and to pass through the third layer, which may be a relatively infrequent occurrence where there are few and/or widely spread pinholes.

The above examples are to be understood as illustrative examples. Further examples are envisaged.

In the examples described above, the first support plate 5 includes a layer 15 comprising, for example formed of, hydrophobic material which is disposed, for example located, on the first layer and which the first fluid adjoins at least a part of. In other examples, the first fluid adjoins at least a part of a surface of the first layer of the plurality of layers. In such examples, the first layer may be hydrophobic and may therefore act both as a hydrophobic layer for the first fluid 11 to adhere preferentially to when a zero voltage is applied and as a first layer of the plurality of layers which, as described above, may provide both a dielectric and a fluid leakage reduction function.

Further examples are envisaged in which an electrowetting element comprises a first fluid and a second fluid immiscible with the first fluid. In these examples, the electrowetting element also comprises a support plate including an electrode for use in applying a voltage to control a configuration of the first and second fluids. The support plate includes a plurality of layers between the electrode and at least one of the first or second fluids. The plurality of layers include a first layer comprising at least one inorganic material and a second layer comprising at least one organic material. The first layer is disposed, for example located, on the second layer, between the second layer and the at least one of the first and second fluids.

These examples may also reduce the leakage of at least one component of at least one of the first fluid or the second fluid from the space of the electrowetting element towards the electrode and thus increase a lifetime of the display device comprising the element.

In examples of the above-described example, the first layer may comprise one or more of: silicon oxide, silicon nitride, aluminium oxide, tantalum oxide, hafnium oxide, titanium dioxide, or zirconium dioxide. Additionally or alternatively, the second layer may comprise one or more of: poly(vinylidene fluoride), poly(vinylidene fluoride) comprising titanium dioxide particles, poly(vinylidene fluoride) comprising zirconium dioxide particles, poly(vinylidene fluoride-co-hexafluoropropylene), poly(vinylidene fluoride-co-hexafluoropropylene) comprising titanium dioxide particles, poly(vinylidene fluoride-co-hexafluoropropylene) comprising zirconium dioxide particles, poly(vinyl alcohol), poly(vinyl alcohol) comprising titanium dioxide particles, poly(vinyl alcohol) comprising zirconium dioxide particles, cyanoEthylPullulan, cyanoEthylPullulan comprising titanium dioxide particles, cyanoEthylPullulan comprising zirconium dioxide particles, polyimide, polyimide comprising titanium dioxide particles, polyimide comprising zirconium dioxide particles or an organosilicon-based material.

Figure 5:
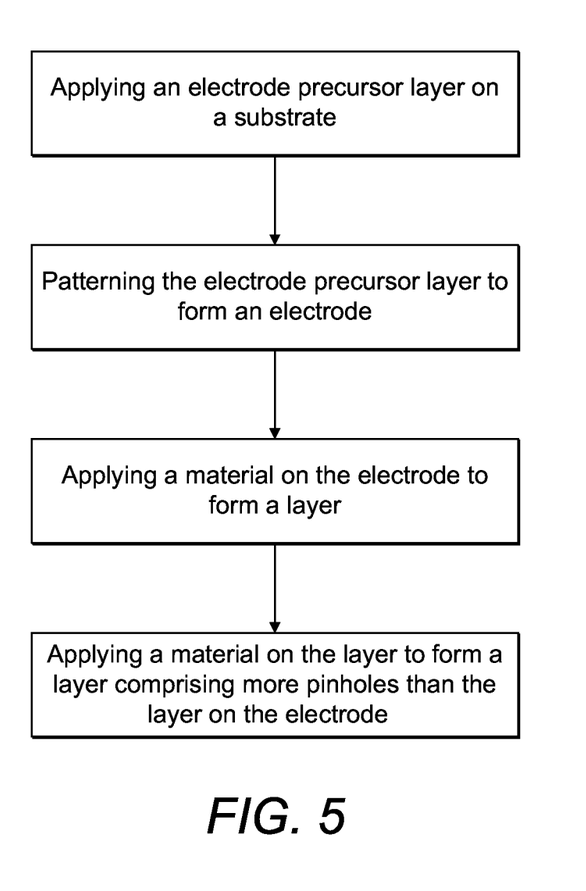
FIG. 5 is a flow diagram relating to examples of a method of manufacturing an electrowetting element.

Examples also relate to a method of manufacturing at least part of a support plate of an electrowetting element, as shown in FIG. 5. Further steps, not shown in FIG. 5, may be included to manufacture a complete support plate. The example methods of FIG. 5 may be used to manufacture a support plate such as the first support plate 5 of FIG. 1.

The example methods of FIG. 5 include applying, for example depositing, an electrode precursor layer on a substrate, which is an underlying layer to the electrode in the support plate. The electrode precursor layer may be applied, for example deposited, using for example chemical or physical vapour deposition (CVD or PVD) for example sputter deposition or electron beam evaporation where temperature, pressure and power are controlled appropriately, as would be understood by the skilled person. Further layers may also be applied, for example deposited, and patterned to form circuitry for controlling the display elements. The electrode precursor layer is patterned to form the electrode of for example ITO using an appropriate patterning technique as the skilled person would understand. An example of such a patterning technique involves masking areas of the electrode precursor layer to remain after the patterning with a photoresist material, using a photo lithography technique to harden the photoresist in areas where the at least one electrode is to be formed, removing the un-hardened photoresist and then etching the applied/deposited metal not covered by the photoresist, for example an acidic etching solution.

In examples according to FIG. 5, a material is applied, for example deposited, on the electrode to form a layer such as the second layer referred to previously with reference to FIGS. 3 and 4. In example methods, a material being applied on an underlying layer may be applied directly on, and therefore in contact with, the underlying layer. In other examples, the material may be applied indirectly on the underlying layer, with a further layer between the material and the underlying layer.

The layer which is formed by applying the material on the electrode may, in some examples, comprise at least one organic material such as poly(vinylidene fluoride), poly (vinylidene fluoride) comprising titanium dioxide particles, poly(vinylidene fluoride) comprising zirconium dioxide particles, poly(vinylidene fluoride-co-hexafluoropropylene), poly(vinylidene fluoride-co-hexafluoropropylene) comprising titanium dioxide particles, poly(vinylidene fluoride-co-hexafluoropropylene) comprising zirconium dioxide particles, poly(vinyl alcohol), poly(vinyl alcohol) comprising titanium dioxide particles, poly(vinyl alcohol) comprising zirconium dioxide particles, cyanoEthylPullulan, cyanoEthylPullulan comprising titanium dioxide particles, cyanoEthylPullulan comprising zirconium dioxide particles, polyimide, polyimide comprising titanium dioxide particles, polyimide comprising zirconium dioxide particles or an organosilicon-based material. In examples, the material may be applied, for example deposited, on the electrode as a liquid, in other words using a wet process such as one or more of a slot die coating process, a spincoating process or a flexoprinting process. A wet process may facilitate forming fewer, or no, pinholes compared with a dry process. Slot die coating involves applying a liquid through a slot onto an underlying layer, which may be passed underneath the slot by rollers for example. In spincoating, a liquid material is applied, for example deposited, at or close to the centre of an underlying layer which is then rotated to spread the liquid material across the underlying layer by centrifugal force. In flexoprinting, a layer of a liquid material is transferred onto a roller or plate with a desired pattern. A scraper, known in the art as a "doctor blade", removes an excess of the liquid material from the roller. Then the substrate is sandwiched between the roller or plate and an impression cylinder to transfer the liquid material to an underlying layer. The liquid material may then be dried.

Applying the material on the electrode as part of a wet process may be more straightforward than using a dry process (in other words with the material applied, for example deposited, as a vapour or solid) and may, for example, allow the material to be applied, for example deposited, as a thinner layer and/or with fewer pinholes than a dry process. In an example, the first layer is formed using plasma enhanced chemical vapour deposition, for example from argon, ammonia ($NH_3$) and silane ($SiH_4$), and the second layer is formed using slot die coating.

In other examples, a dry process, for example a vacuum technique such as an initiated chemical vapour deposition process may be used to deposit a material on the electrode to form a layer such as the second layer described above. When a vacuum technique is used, a monomer and an initiator are for example first vaporised and then injected into a deposition chamber where the material is deposited on a substrate.

The example methods of manufacture of FIG. 5 further include applying a material on the layer to form a layer comprising more pinholes than the layer on the electrode. This layer is for example the first layer referred to herein. The layer comprising more pinholes than the layer on the electrode may, in examples, comprise at least one inorganic material such as silicon oxide, silicon nitride, aluminium oxide, tantalum oxide, hafnium oxide, titanium dioxide, or zirconium dioxide. A dry process, for example in which the material is applied, for example deposited, on the layer in a form other than liquid form, for example as a vapour, solid or as solid particles, may be used. Such a dry process may involve one or more of: a chemical vapour deposition process, a plasma enhanced chemical vapour deposition process, or an atomic layer deposition process. In chemical vapour deposition, a substrate may be exposed to one or more volatile precursors in the form of vapours which react and/or decompose on the substrate to deposit the material on the substrate. Plasma enhanced chemical vapour deposition is similar to chemical vapour deposition but involves forming a plasma of the one or more precursors, for example by filling a space between two electrodes with the one or more precursors in the form of vapours and then applying a radio frequency using either alternating current or direct current discharge between two electrodes. In an atomic layer deposition process, precursors react with a surface of a material sequentially, thereby depositing a layer which is for example a dense layer.

In some examples, using plasma enhanced chemical vapour deposition to form the first layer and initiated chemical vapour deposition to form the second layer, both the first and second layers can be deposited in a vacuum in examples. The combination of these two deposition methods means that both the first and second layers can be deposited using the same system, avoiding surface contamination during transport between a vacuum and a slot die coater, for example.

In examples, material for forming one or more additional layers, for example the third layer 54 described above with reference to FIG. 4, may be applied, for example deposited, on the electrode or on the layer comprising a plurality of pinholes. For example, material may be applied, for example deposited, to form a plurality of layers which alternate between a layer and a layer comprising more pinholes.

The methods of FIG. 5 may additionally include applying a layer comprising hydrophobic material on the layer comprising a plurality of pinholes. The layer comprising hydrophobic material may be applied, for example deposited, using for example a slot die coating or spincoating process, as the skilled person would appreciate. In other examples, an outer surface of the layer comprising a plurality of pinholes may be treated, for example to change a property of the outer surface of the coating, for example to reduce the wettability for the first fluid. This treatment may be reactive ion etching (RIE), for example using radio frequency initiated plasma, which the skilled person would readily be familiar with and which can be applied selectively to form parts of a surface of the first support plate which are to have a lower wettability for the first fluid than other parts (though in other examples different materials may additionally or instead be applied which have different wettability properties, for forming surfaces with different wettability properties). In other examples, it may not be necessary to treat the outer surface of the layer.

Subsequent to the steps described above, wall material may be applied, for example deposited, on the hydrophobic layer or the layer comprising a plurality of pinholes, either directly or indirectly. The wall material may then be patterned to form at least one wall for confining the first fluid to a display area of the second support plate. The wall material may be SU8 and the patterning may therefore be performed using an appropriate photoresist technique as the skilled person will readily understand.

Figure 6:
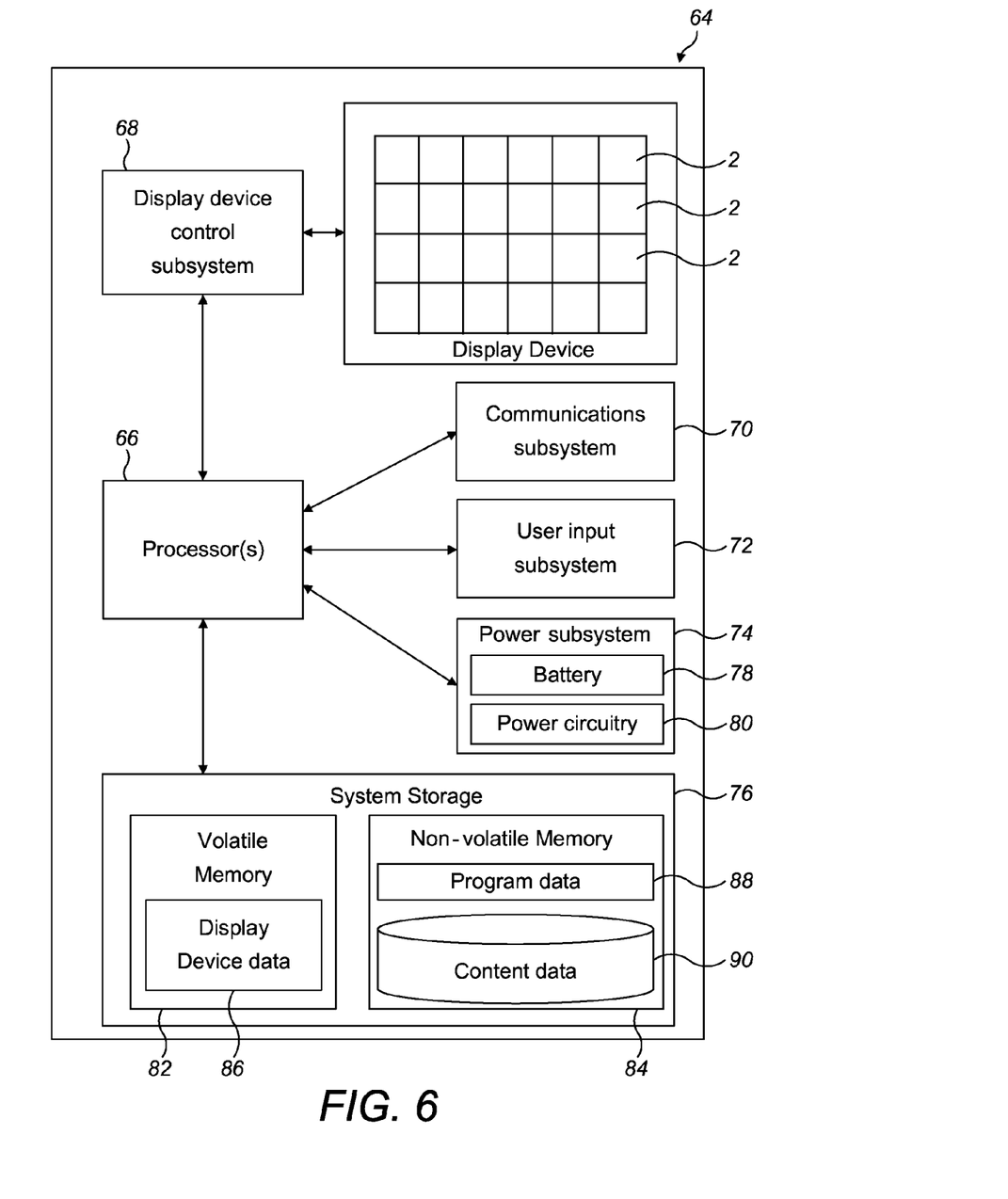
FIG. 6 shows a schematic system diagram of an example apparatus including an electrowetting display device.

FIG. 6 shows schematically a system diagram of an example system, for example apparatus 64, comprising an electrowetting display device such as the electrowetting display device 1 described above comprising electrowetting display elements 2. The apparatus is for example a portable, i.e. mobile, device such as an electronic reader device such as a so-called "e-reader", a tablet computing device, a laptop computing device, a mobile telecommunications device, a watch or a satellite navigation device; the apparatus may alternatively be a display screen for installation in any machine or device requiring a display screen, for example a consumer appliance.

The system diagram illustrates an example of a basic hardware architecture of the apparatus 64. The apparatus includes at least one processor 66 connected to and therefore in data communication with for example: a display device control subsystem 68, a communications subsystem 70, a user input subsystem 72, a power subsystem 74 and system storage 76. The display device control subsystem is connected to and is therefore in data communication with the display device 1. The at least one processor 66 is for example a general purpose processor, a microprocessor, a digital signal processor (DSP), an application specific integrated circuit (ASIC), a field programmable gate array (FPGA) or other programmable logic device, a discrete gate or transistor logic, discrete hardware components, or any suitable combination thereof designed to perform the functions described herein. A processor may also be implemented as a combination of computing devices, e.g., a combination of a DSP and a microprocessor, a plurality of microprocessors, one or more microprocessors in conjunction with a DSP core, or any other such configuration. The processor may be coupled, via one or more buses, to read information from or write information to one or more memories, for example those of the system storage 76. The at least one processor may additionally, or in the alternative, contain memory, such as processor registers.

The display device control subsystem 68 for example includes electrowetting display element driver components, for use in applying a voltage to any of the electrowetting display elements, to address different such display elements. In examples the electrowetting display elements are configured according to an active matrix configuration and the display device control subsystem is configured to control switching elements such as thin film transistors (TFTs) of the display device 1 via circuitry to control the electrowetting display elements. The circuitry may include signal and control lines such as those described above.

The communications subsystem 70 for example is configured for the apparatus to communicate with for example a computing device via a data network, for example a computer network such as the Internet, a local area network, a wide area network, a telecommunications network, a wired network, a wireless network, or some other type of network. The communications subsystem 70 may further for example comprise an input/output (I/O) interface, such as a universal serial bus (USB) connection, a Bluetooth or infrared connection, or a data network interface for connecting the apparatus to a data network such as any of those described above. Content data as described later may be transferred to the apparatus via the communications subsystem.

The user input subsystem 72 may include for example an input device for receiving input from a user of the apparatus. Example input devices include, but are not limited to, a keyboard, a rollerball, buttons, keys, switches, a pointing device, a mouse, a joystick, a remote control, an infrared detector, a voice recognition system, a bar code reader, a scanner, a video camera (possibly coupled with video processing software to, e.g., detect hand gestures or facial gestures), a motion detector, a microphone (possibly coupled to audio processing software to, e.g., detect voice commands), or other device capable of transmitting information from a user to the device. The input device may also take the form of a touch-screen associated with the display device, in which case a user responds to prompts on the display device by touch. The user may enter textual information through the input device such as the keyboard or the touch-screen.

The apparatus may also include a user output subsystem (not illustrated) including for example an output device for providing output to a user of the apparatus. Examples include, but are not limited to, a printing device, an audio output device including for example one or more speakers, headphones, earphones, alarms, or haptic output devices. The output device may be a connector port for connecting to one of the other output devices described, such as earphones.

The power subsystem 74 for example includes power circuitry 80 for use in transferring and controlling power consumed by the apparatus. The power may be provided by a mains electricity supply or from a battery 78, via the power circuitry. The power circuitry may further be used for charging the battery from a mains electricity supply.

The system storage 76 includes at least one memory, for example at least one of volatile memory 82 and non-volatile memory 84 and may comprise a non-transitory computer readable storage medium. The volatile memory may for example be a Random Access Memory (RAM). The non-volatile (NV) memory may for example be a solid state drive (SSD) such as Flash memory, or Read Only Memory (ROM). Further storage technologies may be used, for example magnetic, optical or tape media, compact disc (CD), digital versatile disc (DVD), Blu-ray or other data storage media. The volatile and/or non-volatile memory may be removable or non-removable.

Any of the memories may store data for controlling the apparatus, for example components or subsystems of the apparatus. Such data may for example be in the form of computer readable and/or executable instructions, i.e. computer program instructions. Therefore, the at least one memory and the computer program instructions may be configured to, with the at least one processor, control a display effect provided by the electrowetting display device.

In the example of FIG. 6, the volatile memory 82 stores for example display device data 86 which is indicative of display effects to be provided by the display device 1. The processor 66 may transmit data, based on the display device data, to the display device control subsystem 68 which in turn outputs signals to the display device for applying voltages to the display elements, for providing display effects from the display device. The non-volatile memory 84 stores for example program data 88 and/or content data 90. The program data is for example data representing computer executable instructions, for example in the form of computer software, for the apparatus to run applications or program modules for the apparatus or components or subsystems of the apparatus to perform certain functions or tasks, and/or for controlling components or subsystems of the apparatus. For example, application or program module data includes any of routines, programs, objects, components, data structures or similar. The content data is for example data representing content for example for a user; such content may represent any form of media, for example text, at least one image or a part thereof, at least one video or a part thereof, at least one sound or music or a part thereof. Data representing an image or a part thereof is for example representative of a display effect to be provided by at least one electrowetting element of the electrowetting display device. The content data may include data representing a library of content, for example a library of any of books, periodicals, newspapers, movies, videos, music, or podcasts, each of which may be represented by a collection of data which represents for example one book or one movie. Such a collection of data may include content data of one type, but may instead include a mixture of content data of different types, for example a movie may be represented by data including at least image data and sound data.

It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the accompanying claims.

What is claimed is:

1. An electrowetting element comprising:
   a first fluid;
   a second fluid immiscible with the first fluid; and
   a support plate comprising:
      an electrode; and
      a plurality of layers between the electrode and at least one of the first fluid or the second fluid, the plurality of layers comprising:
         a first layer comprising a first plurality of pinholes; and
         a second layer comprising fewer pinholes than the first layer,
         the first layer disposed on the second layer, between the second layer and the at least one of the first fluid or the second fluid.

2. The electrowetting element according to claim 1, wherein
   the first layer comprises a first material with a first transmission rate for transmission of a component of the at least one of the first fluid or the second fluid through the first layer; and
   the second layer comprises a second material with a second transmission rate for transmission of the component of the at least one of the first fluid or the second fluid through the second layer,
   the first transmission rate lower than the second transmission rate.

3. The electrowetting element according to claim 1, wherein at least one pinhole of the first plurality of pinholes comprises:
   a first pinhole end closest to the at least one of the first fluid or the second fluid,
   a second pinhole end closest to the second layer, and
   a pinhole pathway extending from the first pinhole end to the second pinhole end.

4. The electrowetting element according to claim 3, the pinhole pathway having a pinhole length which is one or more of:
   substantially equal to a thickness of the first layer; or
   greater than the first thickness by at least one of: 20%, 30%, 40%, less than 50%, approximately 50%, or 50%, of the first thickness.

5. The electrowetting element according to claim 1, wherein the second layer has:
   a first surface contacting the first layer,
   a second surface closest to the electrode, and
   a plurality of migration pathways each extending from the first surface to the second surface.

6. The electrowetting element according to claim 5, a migration pathway of the plurality of migration pathways having a migration pathway length which is at least twice a second thickness of the second layer.

7. The electrowetting element according to claim 5, a migration pathway of the plurality of migration pathways extending laterally through the second layer such that one or more of:
   the migration pathway extends laterally through the second layer by a distance which is at least twice a second thickness of the second layer, or
   the migration pathway extends laterally into a second layer of an adjacent electrowetting element.

8. The electrowetting element according to claim 5, wherein a pinhole of the first plurality of pinholes comprises:
   a first pinhole end closest to the at least one of the first fluid or the second fluid,
   a second pinhole end closest to the second layer, and
   a pinhole pathway extending from the first pinhole end to the second pinhole end for a component of the at least one of the first fluid or the second fluid to pass through the first layer; and
   a migration pathway of the plurality of migration pathways comprises:
      a first migration pathway end closest to the first layer, and
      a second migration pathway end closest to the electrode; and
   the first migration pathway end is laterally offset from the second pinhole end.

9. The electrowetting element according to claim 1, wherein
   a first unit volume of the first layer has a first plurality of voids together occupying a first total void volume; and
   a second unit volume of the second layer has a second plurality of voids together occupying a second total void volume,
   the first total void volume lower than the second total void volume.

10. The electrowetting element according to claim 1, wherein the plurality of layers comprises a third layer comprising a second plurality of pinholes, the second layer disposed on the third layer, between the first layer and the third layer.

11. The electrowetting element according to claim 10, wherein a first pinhole of the first plurality of pinholes is laterally offset from a second pinhole of the second plurality of pinholes.

12. The electrowetting element according to claim 10, wherein a lateral distance between one or more of:
   two neighbouring pinholes of the first plurality of pinholes, or
   two neighbouring pinholes of the second plurality of pinholes is larger than a second thickness of the second layer.

13. The electrowetting element according to claim 1, wherein
   the first layer comprises a first material with a first dielectric constant which is one of substantially equal to or higher than 3.5; and the second layer comprises a second material with a second dielectric constant which is one of substantially equal to or higher than 3.5.

14. The electrowetting element according to claim 1, wherein the second layer comprises:
   a first material having a dielectric constant which is one of substantially equal to or higher than 3.5; and
   a second material having a dielectric constant which is less than 3.5.

15. The electrowetting element according to claim 1, wherein the first layer comprises at least one inorganic material and the second layer comprises at least one organic material.

16. The electrowetting element according to claim 1, wherein the second layer comprises one or more of: poly(vinylidene fluoride), poly(vinylidene fluoride) comprising titanium dioxide particles, poly(vinylidene fluoride) comprising zirconium dioxide particles, poly(vinylidene fluoride-co-hexafluoropropylene), poly(vinylidene fluoride-co-hexafluoropropylene) comprising titanium dioxide particles, poly(vinylidene fluoride-co-hexafluoropropylene) comprising zirconium dioxide particles, poly(vinyl alcohol), poly(vinyl alcohol) comprising titanium dioxide particles, poly(vinyl alcohol) comprising zirconium dioxide particles, cyanoEthylPullulan, cyanoEthylPullulan comprising titanium dioxide particles, cyanoEthylPullulan comprising zirconium dioxide particles, polyimide, polyimide comprising titanium dioxide particles, polyimide comprising zirconium dioxide particles or an organosilicon-based material.

17. The electrowetting element according to claim 1, wherein the first layer comprises one or more of: silicon oxide, silicon nitride, aluminium oxide, tantalum oxide, hafnium oxide, titanium dioxide, or zirconium dioxide.

18. The electrowetting element according to claim 1, wherein the support plate comprising a hydrophobic layer, the first fluid adjoining a surface of the hydrophobic layer.

19. The electrowetting element according to claim 1, wherein the second layer is substantially free from pinholes.

20. A display device comprising:
an electrowetting element comprising:
   a first fluid;
   a second fluid immiscible with the first fluid; and
   a support plate comprising:
      an electrode; and
      a plurality of layers between the electrode and at least one of the first fluid or the second fluid, the plurality of layers comprising:
         a first layer comprising a first plurality of pinholes; and
         a second layer comprising fewer pinholes than the first layer,
         the first layer disposed on the second layer, between the second layer and the at least one of the first fluid or the second fluid;
a processor; and
a memory comprising computer program instructions, the memory and the computer program instructions being configured to, with the processor, control the electrowetting display device to control a configuration of the first fluid and the second fluid.

21. The display device according to claim 20, wherein
the first layer comprises a first material with a first transmission rate for transmission of a component of the at least one of the first fluid or the second fluid through the first layer; and
the second layer comprises a second material with a second transmission rate for transmission of the component of the at least one of the first fluid or the second fluid through the second layer,
the first transmission rate lower than the second transmission rate.

22. The display device according to claim 20, wherein the first layer comprises at least one inorganic material and the second layer comprises at least one organic material.

23. The electrowetting element according to claim 1, wherein the first layer comprises more than one pinhole per 100 micrometers squared and the second layer comprises at most one pinhole per 100 micrometers squared.

24. The electrowetting element according to claim 10, wherein the second layer comprises fewer pinholes than the third layer.

* * * * *

UNITED STATES PATENT AND TRADEMARK OFFICE
CERTIFICATE OF CORRECTION

PATENT NO. : 9,529,188 B2
APPLICATION NO. : 14/667896
DATED : December 27, 2016
INVENTOR(S) : Petcu et al.

Page 1 of 1

It is certified that error appears in the above-identified patent and that said Letters Patent is hereby corrected as shown below:

On the Title Page

Item (56), under "OTHER PUBLICATIONS", in Column 2, Line 7, delete "AI2O3" and insert --Al2O3--, therefor.

In the Claims

In Column 23, Line 58, in Claim 4, delete "to a" and insert --to a first--, therefor.

In Column 25, Line 39, in Claim 18, delete "comprising" and insert --comprises--, therefor.

Signed and Sealed this
Twenty-eighth Day of February, 2017

Michelle K. Lee
*Director of the United States Patent and Trademark Office*